United States Patent [19]
Sargeant

[11] 3,947,096
[45] Mar. 30, 1976

[54] REAR-VIEW MIRROR SYSTEM FOR ROAD VEHICLES

[75] Inventor: Archibald Sargeant, Felpham, England

[73] Assignee: Wingard Limited, Chichester, England

[22] Filed: Dec. 23, 1974

[21] Appl. No.: 535,508

[52] U.S. Cl. .............................. 350/302; 350/280
[51] Int. Cl.² .................. G02B 5/08; G02B 17/00
[58] Field of Search .......... 350/301, 302, 307, 299, 350/288, 280, 279, 278, 283

[56] References Cited
UNITED STATES PATENTS

| | | | |
|---|---|---|---|
| 1,365,247 | 1/1921 | Kennedy | 350/302 |
| 1,919,475 | 7/1933 | McKinley | 350/280 |
| 2,502,699 | 4/1950 | Budreck | 350/280 |
| 3,229,580 | 11/1966 | Mitchell | 350/302 |
| 3,498,697 | 3/1970 | Matteo | 350/302 |
| 3,827,788 | 8/1974 | Clark | 350/301 |
| 3,843,237 | 10/1974 | Smith et al. | 350/302 |

*Primary Examiner*—Alfred E. Smith
*Assistant Examiner*—Jon W. Henry
*Attorney, Agent, or Firm*—Scrivener Parker Scrivener and Clarke

[57] ABSTRACT

A rear view mirror system adapted to be incorporated in a road vehicle comprises co-operating first and second flat mirrors of which the first extends rearwardly and upwardly at an acute angle to the horizontal from a transverse line on the vehicle roof adjacent to the upper edge of the windshield and the second extends rearwardly and downwardly at an acute angle to the horizontal from the same line, the first mirror being viewed through an opening in the roof.

5 Claims, 3 Drawing Figures

U.S. Patent   March 30, 1976   3,947,096
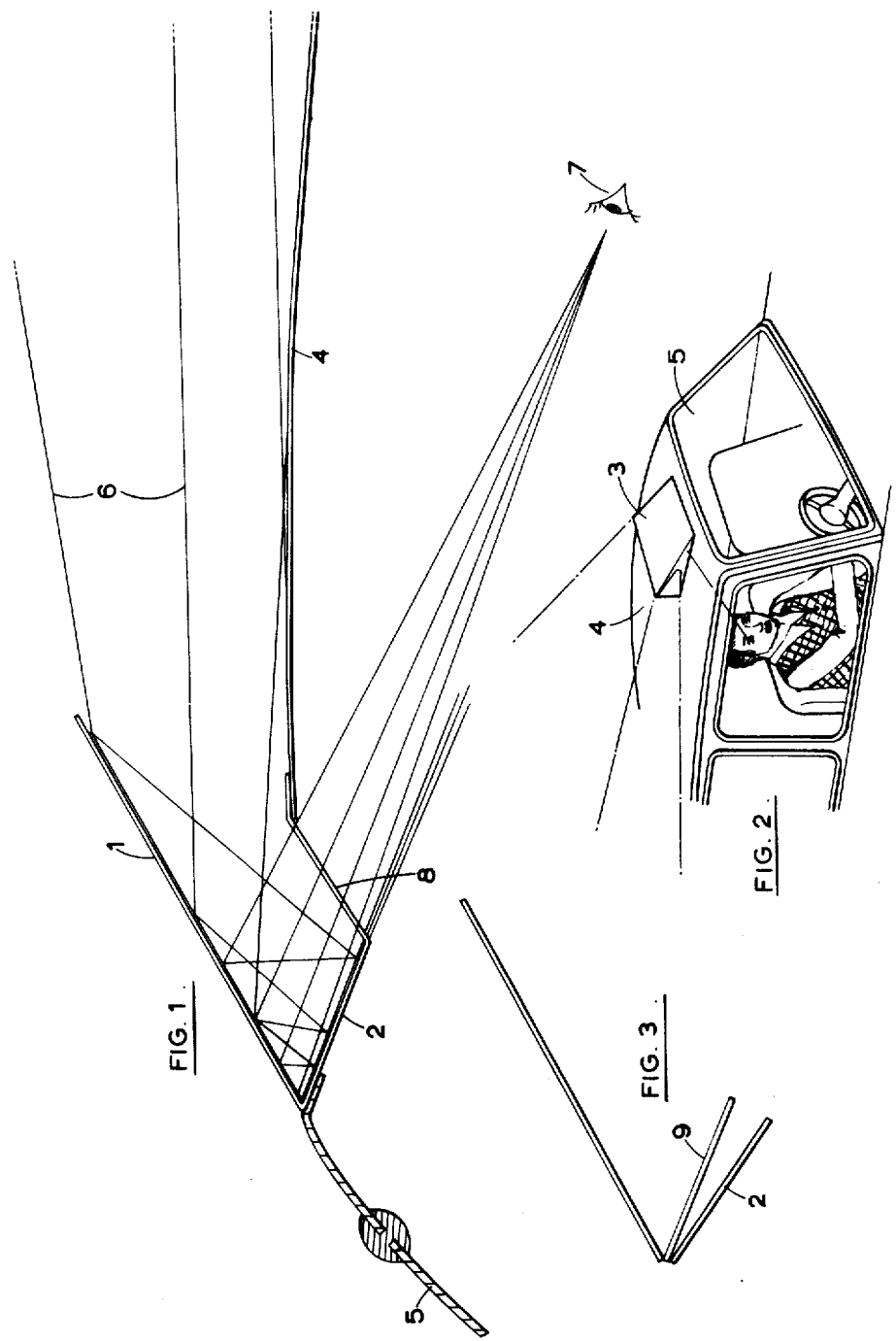

REAR-VIEW MIRROR SYSTEM FOR ROAD VEHICLES

This invention relates to an improved rear-view mirror system for road vehicles.

In modern conditions, and particularly on motorways, it is essential for the driver of a vehicle to be able to watch other vehicles coming up behind, and vehicles are normally fitted with an interior rear-view mirror with or without an additional external mirror mounted on a wing or other part of the vehicle.

The interior mirror is mounted on the windshield or on the roof or other part of the body adjacent to the top or bottom of the windshield and what is seen in the mirror is the view through the rear window in the case of an ordinary saloon car.

Vehicles directly behind can be seen, but the rear quarters of the body restrict the width of the view and are liable to create blind areas so that a vehicle about to pass may be temporarily obscured, and this is liable to lead to accidents.

To overcome this difficulty various forms of mirror of the periscope type have been proposed, the mirror projecting above the roof and being viewed either directly or by reflection in another mirror inside the vehicle so that the driver has a clear view rearwardly over the roof. Most of these system have been clumsy and bulky and have involved the projection of a substantial structure from the roof.

According to our invention a rear-view mirror system comprises two co-operating flat mirrors of which the first extends rearwardly and upwardly at an acute angle to the horizontal from a line in or on the vehicle roof adjacent to the upper edge of the windshield, and the second extends rearwardly and downwardly at an acute angle to the horizontal from the same line.

The first mirror extends above the roof and is viewed by the driver of the vehicle through a transparent window in the roof substantially parallel to the mirror.

Light rays coming from the rear of the vehicle over the roof strike the first mirror and are reflected on to the second mirror from which they are reflected back to the first mirror and from there through the window to the eye of the driver who thus has a clear uninterrupted view of the road behind.

The assembly of the two mirrors may be angularly adjustable about the meeting point of the front edges of the mirrors to suit drivers of different height and/or the inclination of the second mirror may be adjustable for optimum viewing.

One practical embodiment of our invention is illustrated by way of example in the accompanying drawings in which:

FIG. 1 is a vertical section on the longitudinal centre line of a car showing the positions of the mirrors and the paths of the light rays, FIG. 2 is a perspective view of the front part of the car showing the position of the driver relative to the mirror assembly, and FIG. 3 is a diagrammatic view of a modification.

In the arrangement illustrated two mirrors 1 and 2 are mounted in a wedge-shaped housing 3 adapted to be fitted into or over an opening in the roof 4 of a car above the windshield 5.

Both mirrors are flat and are rectangular in outline and their front edges meet or are in close proximity to each other on a line substantially at right angles to the longitudinal centre line of the car.

The mirror 1 is inclined rearwardly and upwardly from its front edge at an acute angle to the horizontal. The second mirror 2 extends rearwardly and downwardly from its front edge at an acute angle to the horizontal.

Horizontal light rays 6 from the rear of the car strike the mirror 1 and are reflected forwardly and downwardly on to the mirror 2 from which they are reflected generally upwardly to the mirror 1. Finally, the rays are reflected rearwardly and downwardly from the mirror 1 through a transparent window 8 in the roof substantially parallel to the mirror 1 and so to the eye 7 of the driver who is seated a short distance to the rear of the assembly of the mirrors.

The housing 3 may be made of sheet metal but preferably it is formed as a plastics moulding. The joint between the housing and the opening in the roof in which it is mounted is sealed by any convenient means to prevent the entry of water or dirt.

The sides of the housing may be closed or the side edges of the mirrors may be cut or marked to give square ends to the image.

The angle between the two mirrors is fairly critical and experiments have shown the optimum angle to be 50° 26'. The inclination of the mirror 1 to the horizontal is of the order of 26° so that the projection of its rear edge above the roof level and hence the depth of the rear end of the housing can be kept relatively small.

The assembly may be mounted for angular adjustment about the meeting front edges of the mirrors to suit drivers of different height, any convenient means being provided for clamping the assembly in a set position. Alternatively, the inclination of the mirror 2 may be adjustable through a small angle for optimum viewing.

In the modification shown in FIG. 3 a fixed sheet 9 of clear glass is located over and at a small angle to the lower mirror 2 which is itself adjustable angularly through a small angle about its front edge to allow the intensity of the image projected to the driver to be reduced and so avoid dazzle from the lights of following cars at night.

I claim:

1. In combination with a road vehicle having a roof and a windshield, a rear view mirror system comprising first and second cooperating flat mirrors, means for supporting one of said mirrors from a line in or on the vehicle roof adjacent said windshield so that the mirror extends rearwardly and upwardly at an acute angle to the horizontal and in a position that at least a part of said mirror adjacent said line may be viewed by the driver of said vehicle, and means for supporting said second mirror from said line so that it extends rearwardly and downwardly at an acute angle to the horizontal from said line and in a position that an image received by said first mirror can be viewed by said driver in said first mirror after reflection on to said second mirror and back on to said first mirror.

2. The combination of claim 1 wherein the first mirror extends above the roof and an opening is provided in the roof adjacent to the first mirror enabling the latter to be viewed through said opening by the driver of the vehicle.

3. The combination of claim 1 wherein the two mirrors are mounted in a housing fitted into or over an opening in the vehicle roof.

4. The combination of claim 1 wherein the angle between the mirrors is 51° 26'.

5. The combination of claim 1 including means for forming an assembly of said mirrors in a predetermined angular relationship relative to said line, and means for adjusting said assembly angularly about said line.

* * * * *